J. J. RICHARDSON.
Truck Barrows.

No. 135,157. Patented Jan. 21, 1873.

UNITED STATES PATENT OFFICE.

JAMES J. RICHARDSON, OF MARION, SOUTH CAROLINA.

IMPROVEMENT IN TRUCK-BARROWS.

Specification forming part of Letters Patent No. 135,157, dated January 21, 1873.

*To all whom it may concern:*

Be it known that I, JAMES J. RICHARDSON, of Marion, in the county of Marion and State of South Carolina, have invented a new and useful Improvement in Truck Barrows, of which the following is a specification:

This invention relates to an improvement in barrows or trucks of the class in which the wheels are arranged under the body of the truck; and it consists in the arrangement of a cross-bar to scrape the wheels of the barrow and connect its sides, as hereinafter described.

Figure 1:
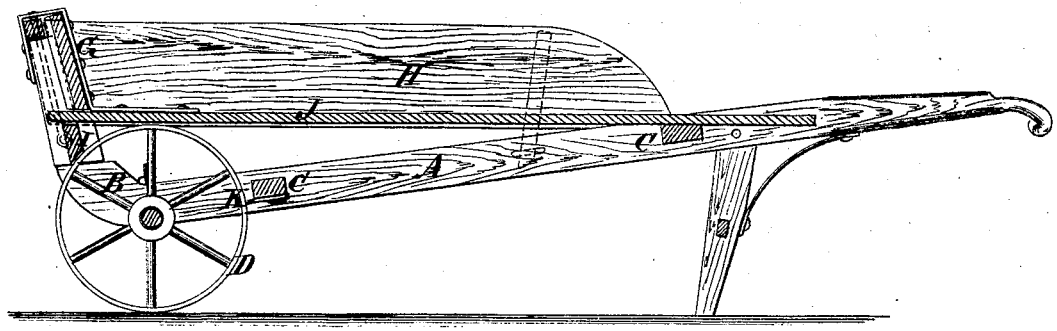
Figure 2:
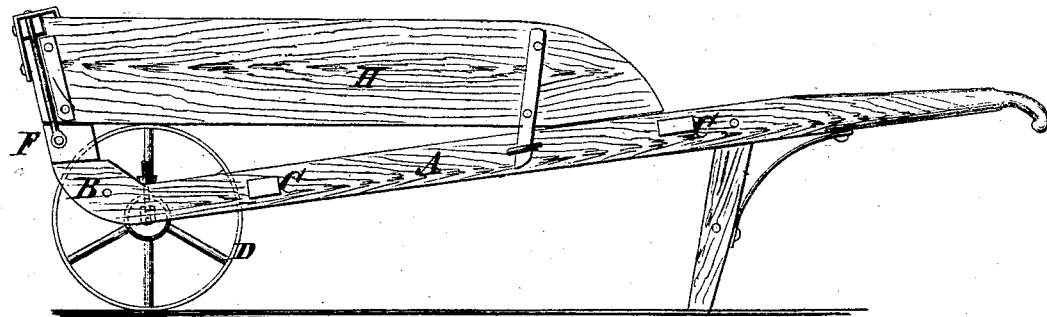
Figure 3:
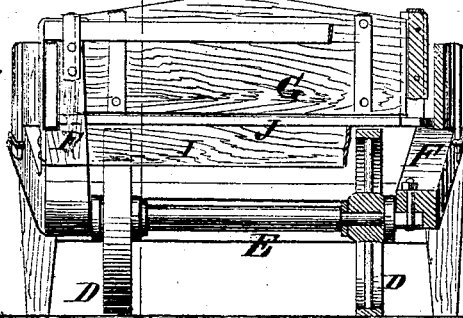

In the accompanying drawing, Figure 1 represents a vertical longitudinal section taken on the line $x$ $x$ of Fig. 3. Fig. 2 is a side elevation. Fig. 3 is a front-end view, partly in section.

Similar letters of reference indicate corresponding parts.

A represents the handle-rails of the frame. These rails are curved upward at their forward ends, as seen at B. C C represent cross-pieces, by which the rails A are connected. D D represent the wheels, which in this example of my invention are arranged to revolve on a stationary shaft, E, secured on the under side of handle-rails, as seen in the drawing; but I do not confine myself to this particular arrangement, as the shaft may be made to revolve with the wheels. F F are front posts mortised into the upturned ends of the handle-rails. These posts support the removable front boards G and the forward ends of the side boards H H. I is a cross-piece standing edgewise, by which the bottom ends of the posts are connected, and the wheels D D scraped, resting on handle-rails at D. J is the bottom, the forward end of which rests on the cross-piece I. This arrangement raises the bottom and allows the weight or load on the barrow or truck to rest directly over the wheels. This allows the barrow to be used as a truck, the load in either case being discharged over the front end when desired.

In handling cotton-bales and other heavy articles the side boards are removed, and such articles are loaded and discharged as when a truck is used. Braces and straps of iron are applied wherever necessary to strengthen the connections, and add to the durability of the combined articles.

K K are thin pieces of sheet metal attached to the forward cross-piece C opposite the wheels, as seen in Fig. 1, the design of which is to scrape the tires or peripheries of the wheels, and thus keep them clear of mud, mortar, or other adhering matter.

Having thus described my invention, I claim as new and desire to secure by Letters Patent—

The cross-bar I arranged to both connect the side portions of the barrow and scrape the wheels D, as specified.

JAMES J. RICHARDSON.

Witnesses:
ALEX. E. BRISTOW,
JAS. M. GODBOLD.